United States Patent [19]
Worcester et al.

[11] 3,962,510
[45] June 8, 1976

[54] WALL COVERINGS AND METHOD OF MAKING THE SAME

[75] Inventors: B. Conley Worcester, East Brunswick; Wayne W. Grobner, East Windsor, both of N.J.

[73] Assignee: Johnson & Johnson, New Brunswick, N.J.

[22] Filed: Oct. 16, 1974

[21] Appl. No.: 515,261

Related U.S. Application Data

[63] Continuation-in-part of Ser. No. 292,599, Sept. 25, 1972, abandoned.

[52] U.S. Cl. ........................ 428/245; 28/73; 139/426 R; 156/148; 156/306; 428/258; 428/259; 428/296; 428/332
[51] Int. Cl.² .................................. D03D 3/00
[58] Field of Search ........... 161/77, 88, 89, 91, 161/90, 92, 150, 151; 156/148, 306; 139/426 R, 420; 28/73; 57/140 BY; 428/258, 259, 296, 245, 332

[56] References Cited
UNITED STATES PATENTS

| | | | |
|---|---|---|---|
| 2,942,327 | 6/1960 | Corry | 161/91 |
| 3,205,119 | 9/1965 | Paul | 161/91 |
| 3,252,484 | 5/1966 | Meyer et al. | 28/73 |

*Primary Examiner*—William J. Van Balen
*Assistant Examiner*—James J. Bell

[57] ABSTRACT

A wall covering having a long dimension and a short dimension and comprising a laminate of a facing matrial bonded to a woven fabric backing material. The backing material is woven with warp and filling yarns with each filling yarn comprising a percentage of thermoplastic fibers. The remaining fibers in each of the filling yarns and the warp yarns are not capable of being autogenously bonded to the facing material. The warp yarns lie in the direction of the long dimension and the filling yarns lie in the directon of the short dimension so the wall covering is rendered more stiff and less flexible in the directon of its short dimension as compred to its long dimension.

11 Claims, 3 Drawing Figures

U.S. Patent   June 8, 1976   3,962,510
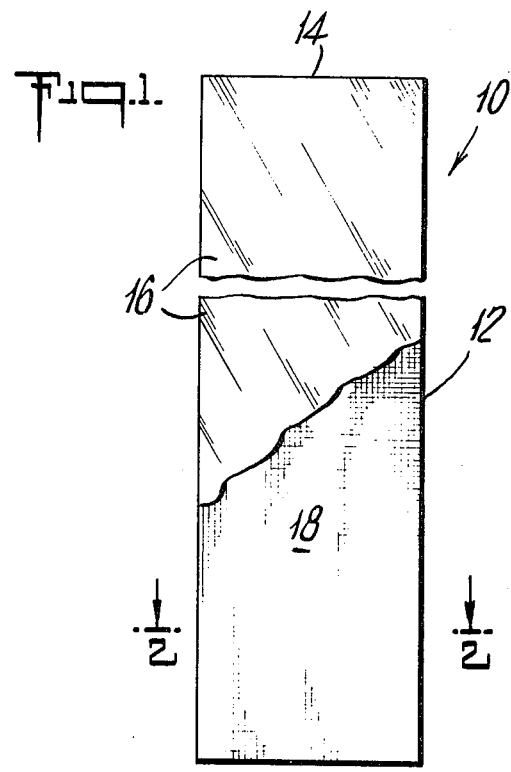
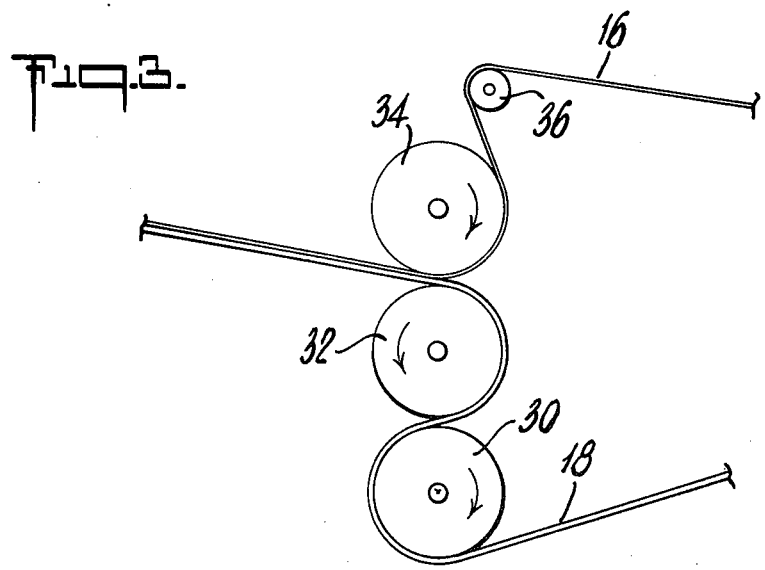

WALL COVERINGS AND METHOD OF MAKING THE SAME

This application is a continuation-in-part of application Ser. No. 292,599, filed Sept. 25, 1972, now abandoned.

The present invention relates to improved wall coverings and to a method of making the same whereby they are easier to handle during application to a wall, are more satisfactory in use, and are easier to strip and remove at a subsequent time. Other advantages and benefits are noted in that thinner films of smaller mil thicknesses of the facing material can be satisfactorily used whereby economies are effected, less bonding pressure is required during the manufacturing process whereby less undesirable "strike-through" or "grin-through" of the fabric weave pattern is obtained, no adhesive is required for the bonding or laminating step, all of which lead to greater economy and efficiency in the manufacturing process.

BACKGROUND OF THE INVENTION

Wall coverings commonly are manufactured and sold in rolled form having width dimensions of from about 18 inches to 60 inches and length dimensions of from about 8 yards to 14 yards, or more.

Although wall coverings made of paper were more commonly used originally, more durable and more washable wall coverings comprising a bonded laminate of a vinyl film facing material and a reinforcing backing material have replaced the wall coverings of paper to some extent. The backing material is commonly a woven fabric, one prime purpose of which is to provide a stronger base so that the wall covering can be more easily handled and applied to a wall surface with less likelihood of ripping or tearing.

Another prime purpose of the woven fabric backing material is to provide a stronger base so that the wall covering can be more easily stripped and removed from the wall surface when it is desired to replace the wall covering for redecorating purposes.

It is therefore very important that the laminating bond between the facing material and the woven fabric backing material be as strong as possible to minimize delamination or separation of the layers of the laminated wall covering during processing, or during application to the wall, or during use on the wall, or during stripping or removal from the wall.

STATEMENT OF THE INVENTION

It has been found that such purposes and other objects to become clearer from a reading hereof may be accomplished by the selective use of particular thermoplastic, self-bondable fibrous materials in a specific way in the woven fabric backing material whereby it can be satisfactorily bonded to the facing material. More specifically, the desired results may be achieved by making a wall covering having a long dimension and a short dimension comprising a laminate of a facing material, such as a polyvinyl chloride film, and a woven fabric backing material bonded to the facing material, the woven backing material being fabricated with warp yarns which are not capable of being autogeneously bonded to the facing material at a temperature at or below the softening temperature of the facing material and filling yarns each filling yarn comprising fibers which are thermoplastic and are capable of being autogeneously bonded to the facing material at a temperature at or below the softening temperature of the facing material, the remaining fibers in each of the filling yarns not being capable of being autogeneously bonded to the facing material at a temperature at or below the softening temperature of the facing material, the woven backing material being so bonded to the facing material that the warp yarns lie in the direction of the long dimension of the wall covering and the filling yarns lie in the direction of the short dimension of the wall covering, whereby the wall covering is rendered more stiff and less flexible in the direction of its short dimension as compared to its long dimension. In the following specification and accompanying drawings, there are described and illustrated preferred embodiments of the invention but it is to be understood that the inventive concept is not to be considered limited to the embodiments disclosed, except as determined by the scope of the appended claims.

BRIEF DESCRIPTION OF THE DRAWINGS

Referring to the accompanying drawings, FIG. 1 is a view in elevation showing a preferred embodiment of a laminated wall covering of the present invention, partially cutaway to show the underlying woven fabric backing material;

FIG. 2 is a view in cross-section of the laminated wall covering of FIG. 1, taken on the line 2—2 thereof, looking in the direction indicated by the arrows; and FIG. 3 is a schematic drawing, showing a typical method of producing the laminated wall covering of the present inventive concept.

DESCRIPTION OF THE PREFERRED EMBODIMENT

Referring to FIG. 1 of the drawings, there is shown a laminated wall covering 10 having a long dimension 12 and a short dimension 14.

The laminated wall covering 10 is commonly manufactured, cut to a desired size, and sold in rolled form having a long dimension or length of from about 8 yards to 14 yards and a short dimension or width of from about 18 inches to 60 inches, or more.

The laminated wall covering 10 comprises a facing material 16 and a woven fabric reinforcing or backing material 18 bonded thereto.

THE FACING MATERIAL

The facing material 16 is most commonly a vinyl film, such as a polyvinyl chloride film, although films of other synthetic plastic materials, such as polyethylene, polyvinylidene chloride, etc., are also of use. The invention will be described with greater particularity with reference to a polyvinyl chloride film as the facing material 16 but such is illustrative and not limitative of the broader aspects of the present inventive concept.

Polyvinyl chloride films are produced in industry by casting, extrusion, or calendering methods. The films exist in plasticized or non-plasticized form, and of specific interest with respect to the present invention, have softening or sticking temperatures in the range of from about 150°F to 200°F.

Merely for reference purposes, the softening or sticking temperature of polyethylene film and polyvinylidene chloride film which are also useful as facing materials is from about 180°F to 250°F and from about 150°F to 200°F (dry), respectively.

The films used are normally in the thickness range of from about 2 mils to 8 mils, or higher, with a preferred range of from about 4 mils to 6 mils. The finish may be either polished or matte, and may be embossed or otherwise processed.

THE BACKING MATERIAL

1. The Warp Yarns

The woven fabric backing material 18 is woven with warp yarns 20 which are made of non-bondable natural or synthetic cellulosic fibers such as cotton or viscose rayon (regenerated cellulose), or synthetic fibers which are non-bondable at temperatures at or below the softening or sticking temperatures of the facing film material 16. Examples of such other "non-bondable" fibers are those of polyamide nylon 6 and 6/6 having softening or sticking points in the range of from about 340°F to 430°F or cellulose triacetate fibers having a softening or sticking temperature of from about 460°F to 480°F, or polyester fibers having softening or sticking temperatures in the range of from about 410°F to 400°F.

The warp yarns are preferably spun yarns and are normally in the size and weight range of from about 10's to 45's, cotton count system, and preferably from about 25's to 35's.

2. The Filling Yarns

The woven fabric backing material 18 also comprises filling yarns 22 each of which comprises sufficient thermoplastic fibers to render the filling yarns bondable at or below the softening or sticking temperature of the facing material 16. Outstanding among the thermoplastic fibers of use in the filling yarns in the present invention are the vinyl and related fibers, notably Vinyon fibers. As used herein, Vinyon is a manufactured fiber in which the fiber-forming substance is any long chain synthetic polymer composed of at least 85% by weight of vinyl chloride units. The most notable examples of Vinyon are Vinyon HH and Avisco Vinyon which are vinyl chloride-vinyl acetate copolymers containing about 87% to 88% vinyl chloride and about 12% to 13% vinyl acetate. The softening or sticking temperature of Vinyon HH and Avisco Vinyon ranges from about 170°F to 200°F.

Polyvinyl chloride fibers and postchlorinated polyvinyl chloride fibers are also of use within the principles of the present invention, provided they possess softening or sticking temperatures equal to or less than that of the synthetic film used as the facing material. The softening or sticking temperature of polyvinyl chloride fibers and postchlorinated polyvinyl chloride fibers is in the range of from about 140°F to 160°F and from about 155°F to 180°F, respectively.

The filling yarns are preferably spun yarns and are normally in the size and weight range of from about 10's to 45's, cotton count system, and preferably from about 30's to 40's.

Each filling yarn in the woven backing material does not comprise all thermoplastic self-bondable fibers. At least 10% by weight of self-bondable fibers must be present in each filling yarn in order for the sufficient effect to be observed. Above about 40% by weight is not desired, with a preferred range extending from about 15% to 30% by weight. The remaining fibers which may be included in each filling yarn are not self-bondable such as cotton or rayon, or may be bondable at higher temperatures than those encountered in the application of the present invention. Such other higher temperature bondable fibers include polyester fibers, polyamide nylon 6 and 6/6 fibers, cellulose triacetate fibers, etc.

The particular weave pattern selected for the woven fabric backing material is either: (1) plain, tabby, or taffeta, such as one wherein one warp passes under and one warp yarn passes over, the filling yarn throughout the fabric construction; (2) twill wherein diagonal lines appear on the face of the fabric — to the right, to the left, or to the right and left which gives a broken twill; or (3) satin wherein a smooth, shiny surface is formed by floats of one yarn usually the warp over the other yarn usually the filling, or vice versa.

THE BONDING PROCESS

The polyvinyl chloride film facing material 16 and the backing material 18 woven from non-bondable warp yarns, preferably cotton and/or rayon, and filling yarns preferably comrising Vinyon HH, are brought into intimate contact, and heat and pressure are applied thereto for a sufficient period of time to bond the two layers together.

The effective temperature used in such bonding must be at or below the softening or sticking temperature of the facing material. Slightly higher temperatures may be tolerated if the duration of exposure to such higher temperatures is relatively short. It is to be appreciated that all temperatures mentioned herein, unless specifically described otherwise, refer to the temperature of the films, fabrics, or other materials being processed. They do not refer to the sources of heat such as heated platens or heated rolls which understandably must be at a slightly higher temperature in order to create the desired temperatures in the films, fabrics or other materials being processed.

In using two-platen presses or similar pressure applying devices which apply heat and pressure from both sides of the materials to be laminated, higher temperatures are permissible on the woven fabric backing side inasmuch as the efficiency of the heat transference to the more critical film facing side is such that the higher temperatures can be tolerated on the woven fabric backing side. The temperatures applied by the heated surface on the film facing side, however, should be lower inasmuch as the direct contact between the film facing and the heated surface promotes the efficiency of the heat transference and higher temperatures on the film facing side cannot be tolerated for too long a time.

The heat applied must be such that it does not raise the temperature of the film facing material above its tacky, softening or sticking temperatures. For polyvinyl chloride film, the upper critical temperature is about 200°F. For the other film materials disclosed herein the upper critical temperature is about 250°F.

The bonding is such that the two layers are intimately and strongly bonded together and possess a high resistance to delamination. The layers need not be pressed together with such a heavy force that the yarns of the woven fabric are pressed too deeply into the film facing as to create the possibility of striking through to the outer surface. No deep penetration or intermeshing is required or desired.

One typical method of bonding the facing material and the woven backing material to each other is illustrated in FIG. 3. A woven backing material 18 is advanced from a supply roll (not shown) to a heated rotatable roll 30 maintained at a temperature of from about 210°F to 325°F but normally about 260°F. The woven fabric 18 is carried around the periphery of the heated roll 30 and is transferred to a second heated rotatable roll 32 maintained at a temperature of from about 210°F to 280°F but normally about 260°F. The woven fabric 18 is carried around the periphery of the heated roll 32 and is led into the nip formed by the heated rotatable roll 32 and a third heated rotatable roll 34.

A film of facing material 16 is advanced from a supply roll (not shown) and is guided by a rotatable guide roll 36 onto the periphery of the heated rotatable roll 34. Inasmuch as the film 16 comes into direct and intimate contact with the heated rotatable roll 34, such roll is maintained at a temperature low enough that it brings the film to a temperature wherein it possess optimum tack for suitable bonding to the thermoplastic fibers in the backing fabric when passing through the nip. Under normal circumstances, the temperature range of the heated rotatable roll 34 is from about 150°F to 250°F and normally about 225°F, depending upon the nature of the film facing material being used.

The film 16 and the woven backing material 18 come together in the nip of the rolls 32 and 34 and the necessary bonding or laminating pressure is applied thereat to form the laminated, composite wall covering. The composite article 10 is then forwarded to a suitable rewind roll to be held for further processing or it may be led to suitable apparatus for immediate processing.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

A wall covering is made to the following specifications: the facing material is a plasticized, 4 mil polyvinyl chloride film (polished finish) and the backing fabric is woven with a warp of 30's cotton yarns and 10's filling yarns comprising a blend of 75% by weight of viscose rayon fibers and 25% by weight of thermoplastic, bondable "Vinyon" (87% vinyl chloride-13% vinyl acetate copolymer) fibers. The facing fabric and the backing fabric are autogeneously bonded to each under pressure at a temperature of about 260°F (backing fabric side) and 200°F (polyvinyl chloride film side) for 15 seconds.

A finished wall covering is intended to measure 21 inches wide and 14 yards long and the woven backing fabric is so bonded to the facing material that its cotton non-bondable warp extends in the direction of the 14 yard long dimension and the rayon-Vinyon bondable filling extends in the direction of the 21 inch short dimension. The wall covering is very flexible in the long direction and rolls and unrolls very easily. The wall covering, however, is more stiff and less flexible in the short direction which does not significantly affect the drape of the wall covering in the long direction and actually facilitates its handling and application to a wall surface. The bond is excellent and the resistance to delamination is very good.

EXAMPLE II

The procedures of Example I are followed substantially as set forth therein with the exception that the bondable filling yarns are made of 90% by weight of viscose rayon fibers and 10% by weight of "Vinyon" fibers. The results are comparable to the results obtained in Example I.

EXAMPLE III

The procedures of Example I are followed substantially as set forth therein with the exception that the bondable filling yarns are made of 75% by weight of "Kodel" type 400 series polyester fibers (softening or sticking temperature — 460°F) and 25% by weight of "Vinyon" fibers. The results are comparable to the results obtained in Example I.

EXAMPLE IV

The procedures of Example I are followed substantially as set forth therein with the exception that the non-bondable warp yarns are made of 100% 1-½ denier 1-¼ inch staple viscose rayon fibers. The results are comparable to the results obtained in Example I.

EXAMPLE V

The procedures of Example I are followed substantially as set forth therein with the exception that the non-bondable warp yarns are made of 50% by weight of 1-½ denier 1-¼ inch staple viscose rayon fibers and 50% by weight of cotton fibers. The results are comparable to the results obtained in Example I.

EXAMPLE VI

The procedures of Example I are followed substantially as set forth therein except that the plasticized polyvinyl chloride film has a matte finish and a thickness of 6 mils. The results are comparable to the results obtained in Example I.

Although specific examples of the inventive concept have been described, the same should not be construed as limited thereby nor to the specific features mentioned therein but to include various other equivalent features as set forth in the claims appended hereto. It is understood that any suitable changes, modifications, and variations may be made without departing from the spirit and scope of the invention.

What is claimed is:

1. A wall covering having a long dimension and a short dimension and comprising a laminate of a synthetic plastic facing material bonded to a woven fabric backing material, said facing material having a thickness between 0.002 inch and 0.008 inch, said backing material woven with warp yarns and filling yarns, each filling yarn comprising from about 10% to 40% by weight of thermoplastic fibers capable of being autogenously bonded to said facing material at or below the softening temperature of said facing material, the remaining fibers in each of said filling yarns and said warp yarns not being capable of being autogenously bonded to said facing material at or below the softening temperature of said facing material, said warp yarns lying in the direction of the long dimension and said filling yarns lying in the direction of the short dimension of said wall covering, whereby said wall covering is rendered more stiff and less flexible in the direction of its short dimension as compared to its long dimension.

2. A wall covering as defined in claim 1 wherein the facing material is a vinyl resin film.

3. A wall covering as defined in claim 1 wherein the facing material is a polyvinyl chloride film.

4. A wall covering as defined in claim 1 wherein the warp yarns consist of cellulosic fibers.

5. A wall covering as defined in claim 1 wherein the warp yarns consist of synthetic fibers which are non-bondable to the facing material at or below the softening temperature of the facing film.

6. A wall covering as defined in claim 1 wherein the warp yarns are spun yarns.

7. A wall covering as defined in claim 1 wherein the filling yarns are spun yarns.

8. A wall covering as defined in claim 1 wherein the warp yarns and the filling yarns are spun yarns.

9. A wall covering as defined in claim 1 wherein the filling yarns comprise vinyl chloride — vinyl acetate copolymer fibers and cellulosic fibers.

10. A wall covering as defined in claim 1 wherein the facing material is a polyvinyl chloride film, the warp yarns are cellulosic, and the filling yarns comprise vinyl chloride — vinyl acetate fibers and cellulosic fibers.

11. A method of making a wall covering having long and short dimensions which is more stiff and less flexible in the direction of its short dimension as compared to its long dimension which comprises weaving a backing material with warp yarns and filling yarns, each filling yarn comprising from about 10% to 40% by weight of thermoplastic fibers capable of being autogenously bonded to a synthetic plastic facing material at or below the softening temperature of the facing material, the remaining fibers in each of said filling yarns and said warp yarns not being capable of being autogenously bonded to said facing material at or below the softening temperature of said facing material, and bonding said backing material to said facing material at a temperature at or below the softening temperature of said facing material with the warp yarns in the direction of the long dimension and the filling yarns in the direction of the short dimension of said wall covering.

* * * * *

UNITED STATES PATENT AND TRADEMARK OFFICE
CERTIFICATE OF CORRECTION

PATENT NO. : 3,962,510
DATED : June 8, 1976
INVENTOR(S) : B. Conley Worcester et al It is certified that error appears in the above-identified patent and that said Letters Patent are hereby corrected as shown below:

In Abstract, last line, "compred" should read --- compared ---.

In Column 3, line 21, "400°F" should read --- 490°F ---.

Signed and Sealed this

Thirtieth Day of November 1976

[SEAL]

Attest:

RUTH C. MASON
Attesting Officer

C. MARSHALL DANN
Commissioner of Patents and Trademarks